United States Patent
Bosma et al.

(10) Patent No.: US 6,901,556 B2
(45) Date of Patent: May 31, 2005

(54) NON-PERSISTENT STATEFUL AD HOC CHECKBOX SELECTION

(75) Inventors: John Hans Handy Bosma, Cedar Park, TX (US); Keith Raymond Walker, Austin, TX (US); Yen-Fu Chen, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 525 days.

(21) Appl. No.: 10/142,613

(22) Filed: May 9, 2002

(65) Prior Publication Data

US 2003/0210282 A1 Nov. 13, 2003

(51) Int. Cl.[7] .................................................. G09G 5/00
(52) U.S. Cl. ...................... 715/769; 715/157; 715/764; 715/821; 715/856; 715/859
(58) Field of Search ................................. 345/157, 764, 345/765, 769, 810, 821, 822–824, 856, 859

(56) References Cited

U.S. PATENT DOCUMENTS

| | | | |
|---|---|---|---|
| 5,959,627 A | 9/1999 | Duwaer et al. ............. 345/345 |
| 6,100,887 A * | 8/2000 | Bormann et al. ........... 715/764 |
| 6,104,398 A | 8/2000 | Cox, Jr. et al. ............. 352/352 |
| 6,252,592 B1 | 6/2001 | King et al. .................. 345/339 |
| 6,535,229 B1 * | 3/2003 | Kraft .......................... 715/764 |
| 6,639,612 B2 * | 10/2003 | Bosma et al. ............... 715/769 |
| 2003/0095153 A1 * | 5/2003 | Bosma et al. ............... 345/859 |

* cited by examiner

*Primary Examiner*—John Cabeca
*Assistant Examiner*—Cuong T. Thai
(74) *Attorney, Agent, or Firm*—John R. Biggers; David A. Mims, Jr.; Biggers & Ohanian, LLP

(57) ABSTRACT

A method for toggling checkbox status, implemented as a software program installed and operating on a computer comprising a computer processor coupled to computer memory. Embodiments of the invention include detecting a touch event on a checkbox, toggling the status of the checkbox, and repeatedly, for a multiplicity of repetitions, carrying out the steps of detecting a drag event for each additional checkbox onto which a user drags the pointer, wherein the user drags the pointer onto at least one additional checkbox, and toggling the status of each additional touch box for which a drag event is detected. Embodiment also include detecting a subsequent drag event for at least one additional checkbox onto which a user drags the pointer more than one during a click-and-drag operation and toggling the selection status of the additional checkbox for which the subsequent drag event is detected to the opposite selection of the additional checkbox when the additional drag event is detected.

27 Claims, 4 Drawing Sheets

NON-PERSISTENT STATEFUL AD HOC CHECKBOX SELECTION

BACKGROUND OF THE INVENTION

1. Field of the Invention

The field of the invention is data processing, or, more specifically, methods, systems, and products for non-persistent, stateful ad hoc checkbox selection in graphical user interfaces.

2. Description of Related Art

The role of checkboxes in user interface design is problematic for users making ad hoc selections of computer data. The typical use of checkboxes is to allow users to select multiple items in a list. Prior to this invention, users generally selected multiple data items using checkboxes in one of several ways, including, for example: 'select all,' 'clear all,' 'toggle all,' 'click individual items,' and 'select all in a group.'

While each of these methods allows selection of multiple data items, each is problematic. Viewed from an efficiency perspective, selection is especially problematic in cases where users make ad hoc choices from a checkbox list. Consider the hypothetical example of a 100-item list, in which the user desires to select 57 of the items. The hypothetical list can be described as "ad hoc" in that no preexisting logical grouping is sufficient to allow selection of items with a single user action. To select the 57 items, a user could 'select all,' then clear 43 individual items by clicking each, resulting in a total of 44 clicks to select the 57 items. Or the user could select 43 items the user does not want, then 'toggle all,' thus selecting the preferred items, again with a total of 44 clicks. Alternatively, the user could click 57 items by single-clicking each item desired. If there is a 'select all in groups' available in the user's GUI, then the number of clicks is dependent on a predefined logical system. In any event, the user would not be able to select 57 ad hoc items with a single click-and-drag operation.

Ad hoc selection is important because users have their own reasons for selecting data in a list; their preferences cannot always be predicted. Moreover, in most cases user preferences in selecting should not be limited to predefined logical groupings. Any system that limits the user to preset groupings undermines the goal of allowing maximal user flexibility, which is the point of checkbox lists in the first place. While each of the above methods in combination allows for ad hoc selection, each is unable to provide an efficient means of selecting data in an ad hoc fashion.

The 'select all' option includes too many items when the user seeks to make ad hoc selections. Obviously, the 'clear all' option selects too few, since no selection is made. The 'toggle all' requires a number of individual clicks and is dependent on preexisting selections. Likewise, the 'click individual items' option requires individual clicks for each item.

The 'select all in group' option has its own inefficiencies. First, 'select all in group' requires development effort to determine preexisting groups of checkbox items. Second, regardless of how well the groups are formulated, ad hoc selection still requires single clicking after a group is selected. That is, the 'select all in group' option provides access to structured means for selection of data, which is the opposite of ad hoc selection. While the 'select all in group' option could shorten the number of clicks to make a particular set of ad hoc selections, that is not its purpose. Moreover, selecting by group can in some cases actually increase the number of clicks required to choose ad hoc items, depending on how closely the groups mirror the choices intended by the user.

Some attempts have been made to deal with these efficiency problems. For example, the invention described in IBM's U.S. Pat. No. 6,104,398, "Fast and efficient means for grouped object selection and deselection," attempts to overcome inefficiencies in item lists requiring users to select or deselect individual items. The '398 patent proposed a means for aggregating checkbox and other data items into predetermined groups so that a single operation could select multiple items. While this was a useful step forward, the method of the '398 patent required such groupings to be determined on a predefined basis. The problem of ad hoc selection of both contiguous and non-contiguous data in a list remained to be solved. Moreover, the method of the '398 patent required the instantiation of new controls external to the checkbox list itself, or in the alternative that some checkboxes control others, thus expanding the number of items in a list. A method that constrained selection controls to the minimum necessary to complete the task was still needed.

The minimum number of selection controls needed to complete an ad hoc selection is equal to the number of items in a list. In other words, there is no need to instantiate controls external to a list if the list is to be chosen in an ad hoc fashion. Fundamentally, the problem with checkbox selection prior to this invention was in dealing with ad hoc selection of data. That is, in any list of computerized data relying on checkboxes, users may need to select both contiguous and non-contiguous data. To select on an ad hoc basis means either checking individual items or relying on groups structured in an a priori fashion. A system that addresses these problems should allow users to select among items with the minimum number of operations necessary. For the purpose of a checkbox list, that minimum number of operations to select one or more items on an ad hoc basis is a single click-and-drag operation. Prior to this invention, no method has existed to allow for ad hoc selection of checkbox items with a single click-and-drag operation.

In fact, structured groupings substitute a priori judgments made by those who define the structure for judgments made by users, potentially imposing new inefficiencies. Selecting a structured group may require de-selection by the user. Ad hoc selection, then, does not imply a lack of structure in selections, although such may be the case, but instead that users impose their own structure on information. The user's definition of the user's intended list structure is generally by definition more efficient than judgments external to the user. It is effectively an unreliable accident if a predefined grouping aids ad hoc selection.

The present invention is a significant departure from previous approaches. For example, the "Official Guidelines for User Interface Developers and Designers" issued by Microsoft (Redmond, Wash.: Microsoft, 1999) specifies that checkbox controls are selected on an individual basis:

"When the user clicks a checkbox with the primary mouse button, either in the checkbox or on its label, the checkbox is selected and its state is toggled. When the user presses the mouse button, the input focus moves to the control and the checkbox displays its pressed appearance. Like option buttons and other controls, if the user moves the pointer off the checkbox or its label while pressing the mouse button, the control's appearance returns to its original state and retains the input focus. The state of the checkbox does not change until the mouse button is released. To change a control's setting, the pointer must be over the checkbox or its label when the user releases the mouse button."

In summary, this means that for checkbox controls relying on mouse clicks, checkbox selection occurs on an individual basis. The user must click on each item s/he wishes to select; the state of selections is not transferred from one checkbox to another. If the mouse moves off the checkbox, the checkbox reverts to its original state and the user cannot continue to select by hovering over other checkbox items. The limitations of prior approaches, then, are traceable to their reliance on mouse clicks as such.

SUMMARY OF THE INVENTION

Exemplary embodiments of the invention include methods for statefully toggling checkbox status, implemented as a software program installed and operating on a computer comprising a computer processor coupled to computer memory, the computer comprising also a computer display which itself further comprises a graphical user interface ("GUI"). Exemplary embodiments typically include a method implemented on the GUI, the GUI operated by a user using a pointing device, the pointing device having a capability of indicating a touch on a checkbox, the pointing device having associated with it through the GUI a pointer displayed upon the GUI and responsive to physical motion of the pointing device, and the GUI having displayed upon it a set of checkboxes comprising a multiplicity of checkboxes, wherein each checkbox has a status comprising an indication whether a checkbox is selected.

Exemplary embodiments typically include detecting a touch event on a first checkbox, toggling the status of the first checkbox to a new status, and repeatedly, for a multiplicity of repetitions, carrying out the steps of detecting a drag event for each additional checkbox onto which a user drags the pointer, toggling the status of each additional touch box for which a drag event is detected to the new status of the first checkbox, detecting a subsequent drag event for the at least one additional checkbox onto which a user drags the pointer more than once during a click-and-drag operation, including determining in dependence upon the drag status of the additional checkbox whether the additional checkbox has experienced a drag event; and statefully toggling the selection status of the additional checkbox for which a subsequent drag event is detected to the opposite of the selection status of the additional checkbox when the additional drag event is detected.

In exemplary embodiments of the invention, for at least a portion of the repetitions, one or more further checkboxes are typically positioned upon the display screen in the GUI between two of the additional checkboxes, where a path along which the pointer drags between the two additional checkboxes lies outside the further checkboxes, and where the statuses of the further checkboxes remain unaffected. In some exemplary embodiments, detecting a touch event typically includes changing a pointer device status to 'active' while a pointer for the device is positioned on the checkbox. In exemplary embodiments, the pointing device is typically a mouse, a stylus pressed upon a touch sensitive pad, or a finger pressed upon a touch sensitive screen. In typical embodiments each checkbox has a GUI image and toggling the status of a checkbox typically includes changing the GUI image of the checkbox to indicate a change in the status of the checkbox.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Introduction

Figure 1:
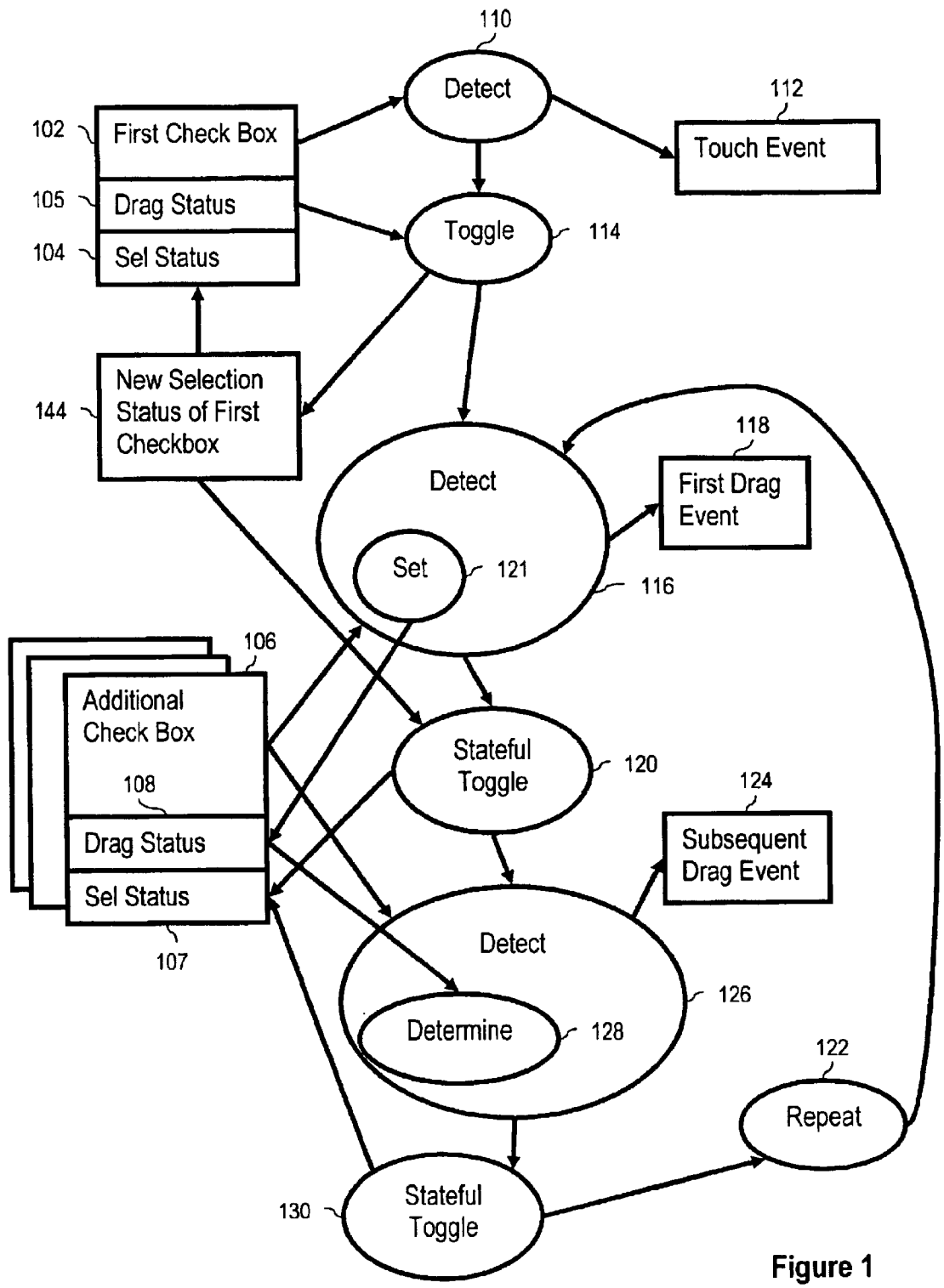
FIG. 1 is a control flow diagram illustrating typical exemplary embodiments of the present invention.

The present invention is described to a large extent in this specification in terms of methods for ad hoc checkbox selection in graphical user interfaces, particularly non-persistent, stateful ad hoc checkbox selection. Persons skilled in the art, however, will recognize that any computer system that includes suitable programming means for operating in accordance with the disclosed methods also falls well within the scope of the present invention.

Suitable programming means include any means for directing a computer system to execute the steps of the method of the invention, including for example, systems comprised of processing units and arithmetic-logic circuits coupled to computer memory, which systems have the capability of storing in computer memory, which computer memory includes electronic circuits configured to store data and program instructions, programmed steps of the method of the invention for execution by a processing unit. The invention also may be embodied in a computer program product, such as a diskette or other recording medium, for use with any suitable data processing system.

Embodiments of a computer program product may be implemented by use of any recording medium for machine-readable information, including magnetic media, optical media, or other suitable media. Persons skilled in the art will immediately recognize that any computer system having suitable programming means will be capable of executing the steps of the method of the invention as embodied in a program product. Persons skilled in the art will recognize immediately that, although most of the exemplary embodiments described in this specification are oriented to software installed and executing on computer hardware, nevertheless, alternative embodiments implemented as firmware or as hardware are well within the scope of the present invention.

Definitions

"Drag" means moving a pointer on a GUI, by use of a pointing device, while the pointing device status is 'active.'

In the case of mice, 'drag' means moving the mouse pointer with a mouse button held down, that is, while the mouse status is 'mouse down.' In the case of a stylus used with a pressure sensitive pad, 'drag' often means moving a pointer by pressing the stylus on the pad and moving the stylus while maintaining the pressure of the stylus on the pad.

"GUI" means graphical user interface.

"Pointer device" means any device coupled to a computer and having the capabilities of indicating pointer device status and moving a pointer displayed on a GUI on the computer. Examples of pointer devices useful with various embodiments of the invention include mice, fingers pressed upon touch sensitive screens, and styli pressed on touch sensitive pads. Other pointer devices will occur to those of skill in the art, and the use of all such pointer devices is well within the scope of the present invention. Pointer device statuses include a status of 'active.' One of the events that will toggle a checkbox occurs, for example, when a pointer device status is changed to 'active' while the pointer is on the checkbox. In the case of mice, 'active' status means 'mouse down.' Pointers moveable on GUIs, in the case of mice, include mouse pointers. In the case of a stylus used with a pressure sensitive pad, 'active' typically means that the stylus is pressed upon the pad. In this specification, because mice and mouseclicks are so common as pointer devices in GUIs, the phrases "first clicked" and "first affected" are considered synonymous.

"Select-and-drag" means activating a pointer device and dragging its pointer across a GUI display while holding it active. In the case of a mouse, select-and-drag is referred to as "click-and-drag." Because mice are so common in user interfaces, the term 'click-and-drag' is used often in this disclosure. Such usage is not intended in any way as limiting pointer devices to mice.

"Status" refers to selection status, an indication, generally comprising a computer memory variable, whether a checkbox is selected. Of course, "selection status" also refers to selection status. "Drag status" is an indication whether a checkbox has experienced a drag event "Stateful toggle" means a toggle of the status of a checkbox that is dependent upon a checkbox selection state or a checkbox drag state. In typical embodiments of the present invention, a "stateful toggle" is a toggle of a checkbox status effected through a select-and-drag operation of a pointer device. Generally in embodiments of the present invention, particularly those using a mouse as a pointer device, a "stateful toggle" is a toggle dependent upon the new status of a first checkbox affected in a select-and-drag operation of a GUI pointer or a click-and-drag operation of a mouse: a toggle occurs if the initial status of a dragged-upon checkbox is different from the new status of a first clicked checkbox. That is, stateful toggles for checkboxes whose initial status is the same as the new status of a first affected checkbox result in no change in status for such checkboxes. In other words, for dragged-upon checkboxes already having the new status of a first affected checkbox, in typical embodiments of the present invention, a stateful toggle has no effect on the status of such dragged-upon checkboxes. In still other words, a stateful toggle is a toggle whose effect depends upon the status of a checkbox, in typical embodiments, a first affected checkbox.

"Non-persistent stateful toggle" refers to the fact that in typical embodiments of the present invention, checkbox selection states do not 'persist' across subsequent drag operations. Upon experiencing a subsequent drag event of a pointer, checkboxes in embodiments of the present invention generally toggle their states. Hence the use of the generally descriptive, but not limiting, term "non-persistent" in the title of this specification.

More specifically, "non-persistent stateful toggle" means a stateful toggle whose current selection status is amenable to change more than once during a single click-and-drag operation. Generally in embodiments of the present invention, on first drag events during a click-and-drag, a "stateful toggle" is a toggle of the status of a checkbox if an initial status of the checkbox is not the same as the new status of a first clicked checkbox. For subsequent drag events on checkboxes that have already experienced one drag event during a particular click-and-drag, stateful toggles for checkboxes already having the new status of a first affected checkbox result in 'non-persistent' stateful toggles to the opposite selection state of the current checkbox. In other words, for dragged-upon checkboxes already having the new status of a first affected checkbox because of an earlier drag event during the same click-and-drag, in typical embodiments of the present invention, a subsequent drag event during the same click-and-drag toggles such checkboxes to the opposite selection status as was held just prior to a subsequent drag event.

DETAILED DESCRIPTION

Embodiments of the present invention provide efficient selection and deselection of ad hoc data elements represented by checkboxes on a GUI form using a single click-and-drag operation. Embodiments of the present invention generally preserve the ability to select or deselect individual items in a data set by reference to the selection state of a preceding selection or a drag state of a current selection. Embodiments of this invention typically solve limitations of prior art, especially with respect to the prior art requirement for multiple touch events from a pointer device, such as mouseclicks from a mouse, by utilizing stateful preservation of the drag status of checkboxes in a set and of the new status of a first affected checkbox and affecting the state of other checkbox items via pointer movement in dependence upon those recorded statuses, that is, pointer movement as such, 'dragging,' rather than additional touch events or 'clicks.' More specifically, embodiments of this invention generally address limitations of prior art by utilizing stateful preservation of the result of a single mouseclick along with drag state affected by pointer movement.

In many embodiments of the present invention, detecting a touch event comprises changing a pointer device status to 'active' while a pointer for the device is positioned on the checkbox. Pointer device statuses typically include a status of 'active.' One of the events that often toggles a checkbox occurs, for example, when a pointer device status is changed to 'active' while a pointer is on the checkbox. Pointer devices include, for example, a mouse, a stylus pressed upon a touch sensitive pad, and a finger pressed upon a touch sensitive screen. In the case of mice, 'active' status means 'mouse button down.' In the case of a stylus used with a pressure sensitive pad, 'active' often means that the stylus is pressed upon the pad.

Because of its ubiquitous use as a pointer device, this specification often discusses examples in terms of mice and mouseclicks. No limitation is intended of pointer devices to mice or touch events to mouseclicks. As will occur to those of skill in the art, many implementations of pointer devices other than mice are well within the scope of this invention.

Consider the example of a user whose interface relies on a primary mouse button setup. When a user clicks on an initial checkbox item in a set of checkboxes, referred to as the "first affected checkbox," the "first clicked checkbox," or simply as the "first checkbox," that checkbox is selected or deselected depending on the previous selection state of the first affected checkbox, resulting in a new selection state of the first affected checkbox. This kind of status change, simply from an initial state to another state, is referred to as a "toggle." The new selection state of the first checkbox is recorded and retained.

Unlike prior art checkbox sets, however, in this example, when the user drags outside of the first affected checkbox, the first affected checkbox retains its new selection state. The user then drags the mouse pointer over additional checkboxes in the set. Checkboxes selected by dragging the mouse pointer have their selection states toggled to the new selection state of the first checkbox. Drag state is set for checkboxes experiencing a first drag event. Subsequent drag events during the same click-and-drag do not affect drag state. Those items selected by dragging the mouse pointer whose selection states are already the same as the new selection state of the initial checkbox are unaffected upon a first drag event, toggled by subsequent drag events. On subsequent pointer drags over a checkbox, the checkbox's selection status is toggled regardless of its earlier or current selection state.

The first affected checkbox typically is included in this method. That is, the new state of the first affected checkbox is recorded, and on subsequent drag operations in the first affected checkbox, its status is toggled, just as the status of other checkboxes is toggled in subsequent drag operations. In a first drag event in a first checkbox, in typical embodiments, the first checkbox's drag state is set 'true' and selection status is not changed because the selection status of the first checkbox was already set to the new selection of the first checkbox when the first checkbox was clicked at the beginning of the current click-and-drag. In such embodiments, in order to get the first checkbox to toggle in drags, it must be dragged twice, two little motions of the GUI pointer, the first one representing a first drag event and the second one representing a subsequent drag event. This mode of operation has the advantage that it makes all programming and all operation for all checkboxes perfectly consistent. To reduce to zero, however, the tiny inconvenience of no effect on first drag in the first checkbox, some embodiments set the drag status of the first checkbox when it is first clicked, despite the fact that, technically speaking, the first checkbox at this point actually has experienced no first drag event, so that all drag events on the first checkbox toggle its selection status, both a first drag event and all subsequent drag events on the first checkbox.

If the user wished to omit items from selection by dragging of the mouse pointer, in typical operation of most embodiments of the present invention, the user simply drags the mouse past or outside the checkboxes for the items to be omitted from selection by the dragging of the mouse pointer. In a checkbox list arranged vertically, the user would drag the mouse pointer past the items by moving the pointer to the left or right and then up or down, so as to bypass checkboxes not to be selected. Of course the reader realizes by now that checkboxes whose initial selection statuses are the same as the new state of the first affected checkbox are unaffected in selection status on first drag events (although their drag states are set on first drags) regardless whether the mouse pointer drags over them or not, so this purpose of not selecting checkboxes with first drag events by missing them with the dragged mouse pointer is in substance directed to checkboxes having initial statuses that are different from the new status of the first affected checkbox.

A release of the primary mouse button, in typical operation of many embodiments of the present invention, discontinues a click-and-drag operation. A click of the primary mouse button on another checkbox in the set reinitiates the process, thus allowing for continued stateful toggling of additional checkboxes. The invention thus reduces the number of operations required to make ad hoc selections from a checkbox list to a theoretical minimum, that is, one click to effect a first selection (or first deselection) and one drag in a single continuing click-and-drag for each additional selection or deselection.

Turning now to FIG. 1, an example embodiment of the present invention is seen illustrated as a method for non-persistent, stateful toggling of checkbox status. The example embodiment of FIG. 1 includes detecting (110) a touch event on a first checkbox (102) and toggling (114) the selection status (104) of the checkbox from its previous selection status to a new selection status of the first checkbox (144). The example embodiment of FIG. 1 includes detecting (116) a first drag event (118) for at least one additional checkbox (106) onto which a user drags a pointer and statefully toggling (120), to the new selection status of the first checkbox, the selection status (108) of the additional touch box for which a drag event is detected. In this example embodiment, detecting (116) a first drag event (118) includes setting the drag status (108) of the additional checkbox (106) to indicate that the checkbox has experienced at least one drag event during a current click-and-drag.

Embodiments of the kind shown in FIG. 1 typically include detecting (116) a subsequent drag event (124) for the at least one additional checkbox (106) onto which a user drags the pointer more than once during a click-and-drag operation, including determining (128) in dependence upon the drag status (108) of the additional checkbox whether the additional checkbox has experienced a drag event. This kind of embodiment includes statefully toggling (130) the selection status (108) of the additional checkbox for which a subsequent drag event is detected to the opposite of the selection status of the additional checkbox when the additional drag event is detected. In addition, embodiments of the kind shown in FIG. 1 typically include repeating (122), for a multiplicity of repetitions, the steps of detecting (116) a first drag event for at least one additional checkbox, statefully toggling (120) the selection status of the additional touch box to the new selection status of the first checkbox; detecting (126) a subsequent drag event for the additional checkbox, and statefully toggling (130) the selection status of the additional checkbox to the opposite of the selection status of the additional checkbox when the additional drag event is detected.

Typical embodiments of the invention are implemented as software programs installed and operating on computers comprising computer processors coupled to computer memory. Embodiments typically include computer displays which in turn further comprise graphical user interfaces or "GUIs." Typical exemplary embodiments are implemented on or within GUIs, where the GUIs are operated by a user using a pointing device, the pointing device having a capability of indicating a touch on a checkbox, the pointing device having associated with it through the GUI a pointer displayed upon the GUI and responsive to physical motion of the pointing device. In this sense, in typical example embodiments, a "pointer" is a graphical analog of a pointer device, the pointer being displayed on a display screen with a GUI display object, such as a GUI window or dialog box, the pointer moving upon the display in dependence upon a user's physical movement of a corresponding pointer device. In the example of a mouse, the mouse pointer moves on a display screen as a user moves the mouse on a mouse pad.

In typical example embodiments of the present invention, a GUI has displayed upon it a set of checkboxes comprising a multiplicity of checkboxes, wherein each checkbox has a status comprising an indication whether a checkbox is selected. That is, checkboxes typically have at least the two statuses 'selected' and 'not selected.' Checkboxes having the status 'not selected' are sometimes referred to as 'deselected.' In typical embodiments, toggling the selection status of a checkbox includes changing the GUI image of the checkbox to indicate a change in the selection status of the checkbox.

Figure 2A:
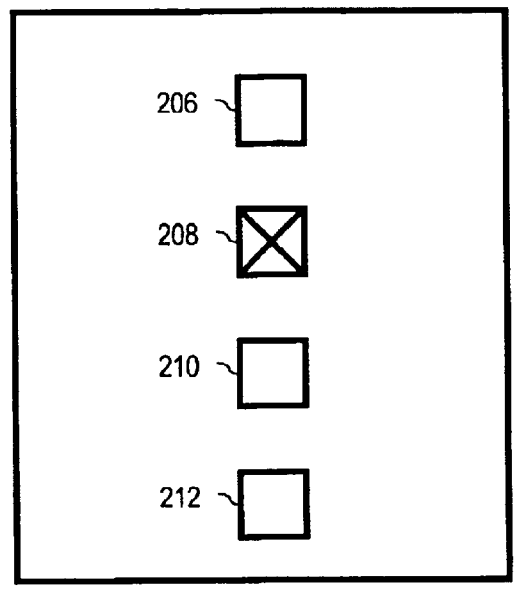
FIG. 2a illustrates initial statuses of checkboxes in a GUI prior to a click-and-drag event.
Figure 2B:
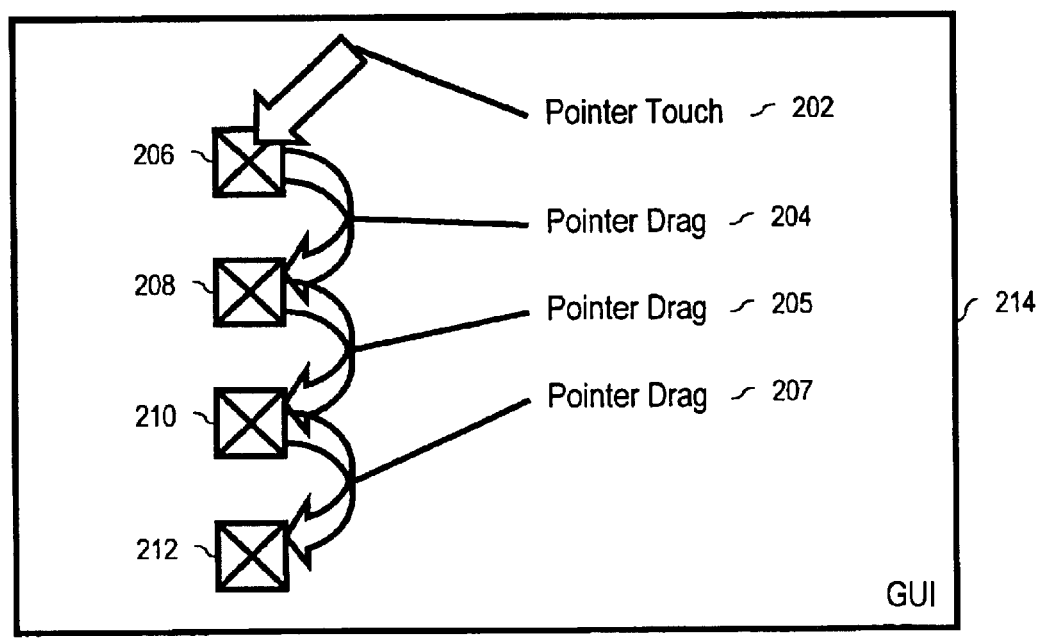
FIG. 2b is a diagram of an example click-and-drag in a GUI illustrating operation of typical exemplary embodiments of the present invention.
Figure 2C:
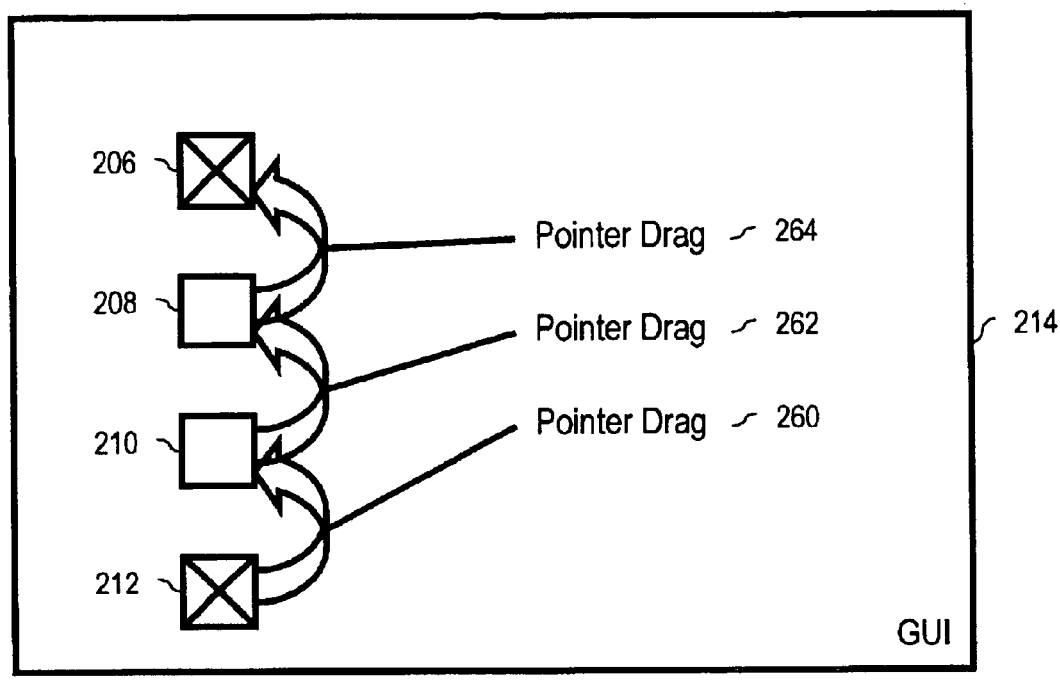
FIG. 2c is a further diagram of an example click-and-drag in a GUI illustrating operation of typical exemplary embodiments of the present invention.

FIGS. 2a, 2b, and 2c illustrate an example of operation of a further exemplary embodiment. The selection statuses of the checkboxes in the illustrated embodiment are shown with 'Xs.' Selected checkboxes are illustrated with Xs, as those at reference 208 in FIG. 2a. Deselected checkboxes are illustrated without Xs, as the checkbox at references (206), (210), and (212) in FIG. 2a. FIG. 2a illustrates the initial selection statuses of checkboxes in a GUI prior to a click-and-drag event. FIGS. 2b and 2c illustrate the results of a touch event followed by a drag on the statuses of the checkboxes whose initial statuses are shown in FIG. 2a.

The checkboxes in the example embodiment of FIG. 2b began the illustrative process deselected, as shown in FIG. 2a, except for checkbox (208) whose initial selection status is 'selected.' In the process illustrated in FIG. 2b, a pointer touch event (202), such as a mouse down event or 'mouse press,' has been detected on first checkbox (206), and the status of first checkbox (206) has been toggled to a new status, from 'deselected' to 'selected,' as indicated by the 'X' in first checkbox (206). Thus in this example, the new status of the first affected checkbox is 'selected.' The new status of the first checkbox has been retained in computer memory.

Further in the process illustrated in FIG. 2a, a pointer drag event (204) in the form of a mouse drag from checkbox (206) to checkbox (208) has been detected, and the selection status of checkbox (208) has been statefully toggled to 'selected,' the new selection status of the first checkbox (206). That is, the selection status of checkbox (208) remains unchanged because the selection status of checkbox (208) was already the same as the new status of the first checkbox, 'selected.' The drag state of checkbox (208) is set 'true' (not shown), indicating that checkbox (208) now has experienced a first drag event. Still further in the process illustrated in FIG. 2a, a further pointer drag event (205) in the exemplary form of a mouse drag from checkbox (208) to checkbox (210) has been detected and the status of checkbox (210) has been statefully toggled from 'deselected' to 'selected,' as indicated by the 'X' in checkbox (210). In this case, the stateful toggle comprised a selection status change because the initial state of checkbox (210) was 'deselected' and the new state of the first checkbox (206) is 'selected.' Similarly, a further pointer drag event (207), an exemplary mouse drag from checkbox (210) to checkbox (212), toggles the status of checkbox (212) from 'deselected' to 'selected,' as indicated by the 'X' in checkbox (210), because the initial state of checkbox (212) was 'deselected' and the new state of the first checkbox (206) is 'selected.' The drag states for both checkboxes (210) and (212) at this point have been set 'true.'

The status toggles for checkboxes (208), (210) and (212) are said to be 'stateful toggles' because change in selection status, or lack of change, depends on the state of a checkbox, that is, upon the new state of the first checkbox (206). Because checkbox (208) had the initial status 'selected,' upon detecting the drag event for that checkbox, the stateful toggle has no effect on the selection status of that checkbox (208). In embodiments of this kind, utilizing a mouse as a pointer device, the stateful toggle on first drag events only changes checkbox statuses for dragged upon checkboxes (210, 212) whose initial statuses are different from the new status of the first affected checkbox (206).

FIG. 2c illustrates a continuation of the same touch and drag begun in FIG. 2b and shows further the sense in which toggles are 'non-persistent' stateful toggles in embodiments of the present invention. In FIG. 2c, a subsequent drag event (260) in the exemplary form of a mouse drag from checkbox (212) to checkbox (210) has been detected and the status of checkbox (210) has been statefully toggled from 'selected' to 'deselected,' indicated by the lack of an 'X' in checkbox (210). In this case, the stateful toggle comprises a state change because the drag state of checkbox (210), which has already experienced a first drag event during the current click-and-drag, is set to to 'true.' Similarly, a subsequent drag event (262), an exemplary mouse drag from checkbox (212) to checkbox (208), toggles the status of checkbox (208) from 'selected' to 'deselected,' again because the drag status of checkbox (208) is 'true.'

FIG. 2c also illustrates the similar nature of the first checkbox with respect to other checkboxes for drag events. A first drag event (264) is detected from checkbox (208) to checkbox (206). This is a 'first drag event' in the sense that it is a first drag event for the first checkbox (206). Although the first checkbox experienced a mouse press at the beginning of the current click-and-drag, the first checkbox has not yet experienced a drag event as such, so this is its first drag event. Because the first checkbox has not yet experienced its first drag event, its drag state is still reset to 'false.' In response to this first drag event, the drag state of the first checkbox (206) is set 'true,' but the selection status of the first checkbox is unaffected because the selection status of the first checkbox is already set to the new selection state of the first checkbox, 'selected.' For a user to toggle the current selection state of the first checkbox, the user simply drags the pointer out of the first checkbox after its first drag event and then drags the pointer right back in, creating a subsequent drag event which then, upon determining that the drag status of the first checkbox is 'true' (because the drag state was just set by the first drag event) toggles the selection state of the first checkbox.

Figure 3A:
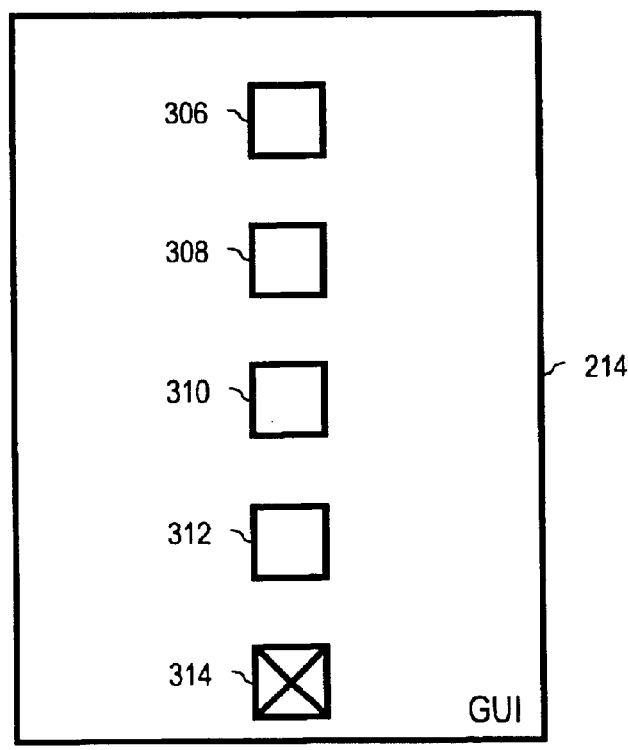
FIG. 3a illustrates initial statuses of checkboxes in a GUI prior to a click-and-drag event.
Figure 3B:
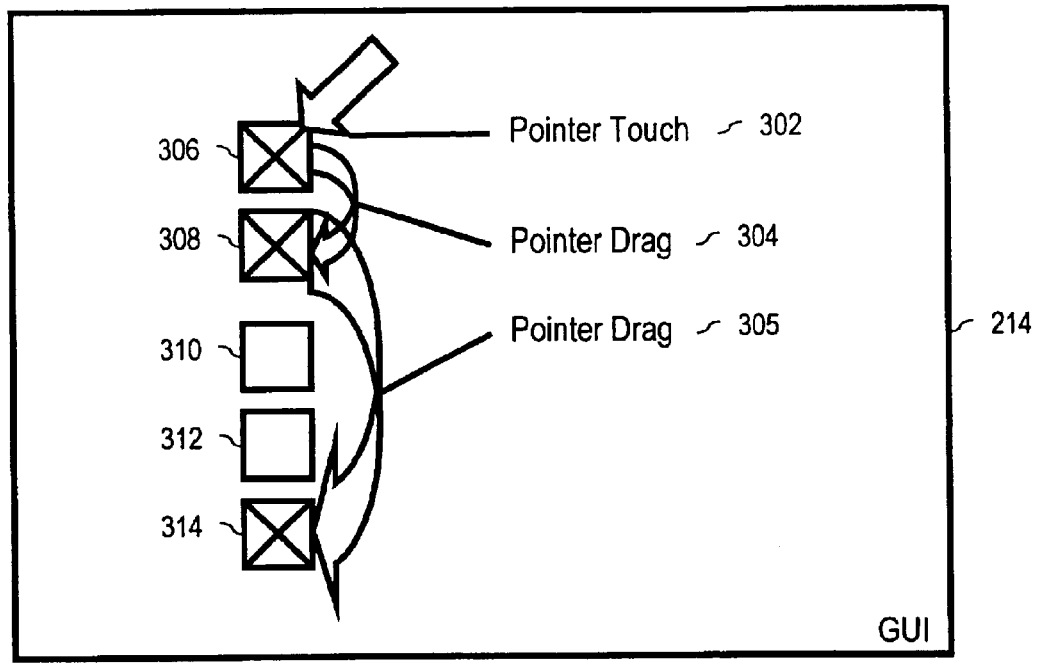
FIG. 3b is a diagram of an example click-and-drag event in a GUI illustrating operation of typical exemplary embodiments of the present invention.
Figure 3C:
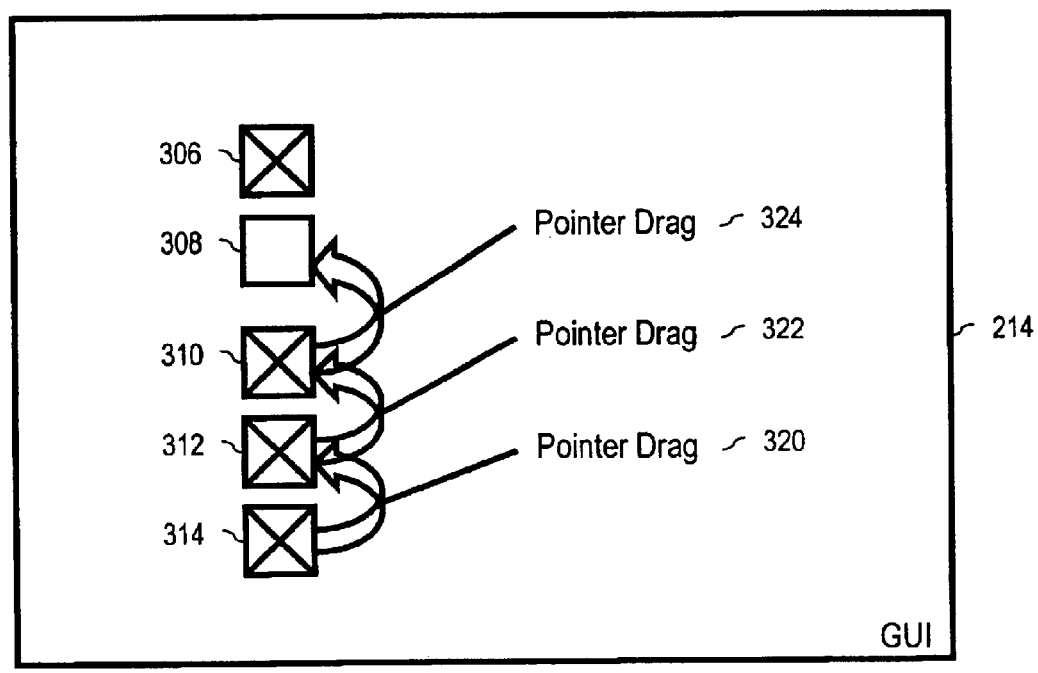
FIG. 3c is a further diagram of an example click-and-drag event in a GUI illustrating operation of typical exemplary embodiments of the present invention.

A still further example embodiment of the invention is illustrated in FIGS. 3a, 3b, and 3c. Like the process illustrated in FIGS. 2b and 2c, the example process illustrated in FIG. 3b includes repeated drag events (304, 305) during a click-and-drag. Like the initial statuses illustrated in FIG. 2a, the initial statuses illustrated in FIG. 3a show the initial statuses of checkboxes (306-314) prior to the execution of the click-and-drag process illustrated by FIG. 3b. In the example of FIG. 3a, however, for at least a portion of the repetitions, one or more further checkboxes (310, 312) are positioned upon the display screen in the GUI (214) between two of the additional checkboxes (308, 312), wherein a path (304) along which the pointer drags between the two additional checkboxes lies outside the further checkboxes, whereby the statuses of the further checkboxes remain unaffected.

More specifically, the checkboxes in the example embodiment of FIG. 3a began the illustrative process deselected, except for the checkbox (314), which, as shown in FIG. 3a, began the illustrative process selected. In the process illustrated in FIG. 3b, a pointer touch event (302) in the exemplary form of a mouse down event or moue press has been detected on first checkbox (306), the selection status of first checkbox (306) has been toggled to a new status, from 'deselected' to 'selected,' as indicated by the 'X' in first checkbox (306), and the new selection status of checkbox (306) has been retained in computer memory. Further in the exemplary process illustrated in FIG. 3b, a pointer drag event (304) in the exemplary form of a mouse drag from first checkbox (306) to checkbox (308), has been detected and, because its drag state is reset or 'false,' indicating this is a first drag event, the status of checkbox (308) has been statefully toggled from 'deselected'to 'selected,' the new selection status of the first checkbox. The drag state of checkbox (306) is set to 'true.' Still further in the process illustrated in FIG. 3b, a further pointer drag event (305), such as, for example, a mouse drag from checkbox (308) to checkbox (314), has been detected, and, the selection status of checkbox (314) has been statefully toggled to 'selected,' and its drag state has been set 'true.' Because the toggle of checkbox (314) is a stateful toggle, the new status of the first checkbox (306) is 'selected,' and the initial status of checkbox (314) is 'selected,' the stateful toggle therefore has no effect on the status of checkbox (314), leaving the status of checkbox (314) 'selected.'

FIG. 3c continues the example of the same click-and-drag begun in FIG. 3b. Without lifting the mouse button, the user continues to drag the pointer back up the GUI screen, this time dragging on checkboxes (312) and (310). That is, checkbox (312) now experiences a first pointer drag event (320), determined in fact to be a first drag event because upon detecting this drag event (320), the drag state for checkbox (312), which has not been dragged before during the current click-and-drag, is still 'false.' This first drag event (320) for checkbox (312) sets the drag state to 'true' for checkbox (312) and statefully toggles the selection state for checkbox (312) to 'true,' as shown now by the 'X' in checkbox (312). Similarly, drag event (322) is a first drag event for checkbox (310), which sets to 'true' the drag state for checkbox (310) and sets to 'selected' the selection status for checkbox (310). Pointer drag event (324), however, is a subsequent drag event for checkbox (308), identified as such by the fact that the drag status for checkbox (308) was already set 'true' during its first drag event described above. Subsequent drag event (324) therefore statefully toggles the selection state of checkbox (308) from 'selected' to 'deselected,' as shown by the lack of an 'X' in checkbox (308) on FIG. 3c.

The examples of FIGS. 2a, 2b, 2c, 3a, 3b, and 3c also illustrate the repetitive quality of typical embodiments of the present invention in that additional checkbox statuses are statefully toggled as a pointer is dragged repeatedly from checkbox to checkbox. FIG. 3b also illustrates that statuses of checkboxes (310, 312) are unaffected if no pointer drag event is detected for them. That is, neither a touch event nor a drag event is detected for checkboxes (310) and (312) in the example embodiment of FIG. 3b, and the status of checkboxes (310) and (312) therefore remains as it was at the beginning of the illustrative process, 'deselected.'

In the example of FIG. 3b, no drag event was detected for checkboxes (310) and (312) because in dragging the pointer from checkbox (308) to checkbox (314), the pointer was dragged around checkboxes (310) and (312) without touching them or passing over them. FIG. 3b illustrates an important advantage of the present invention in that checkbox statuses are toggled in a completely ad hoc fashion just as fast as a user can think and move a pointer across a GUI display, statefully toggling some checkboxes by passing a pointer over them, leaving others unaffected by moving the pointer around them without passing over them.

Even more specifically, many embodiments of the invention operate as illustrated in the following pseudocode:

```
//import the Java classes necessary to implement the stateful ad hoc checkbox set.
import java.awt.*;
import java.awt.event.*;
import javax.swing.*;
import java.awt.event.MouseAdapter;
import java.awt.event.MouseMotionAdapter;
import java.awt.event.MouseEvent;
// begin dragCheckbox class
public class dragCheckBox extends JCheckBox
{
    // declare boolean dragCheck
    public boolean dragCheck
    // constructor for dragCheckBox object:
    // creates a new dragCheckBox object and
    // sets dragCheck to false
    public dragCheckBox (string name, dragcheck.false ) { }
    // function to check whether a checkbox has been dragged
    // and, if it has not been dragged, set dragCheck
    public dragCheck( )
    {
        if(this.dragCheck = false) this.dragCheck=true
    }
}//end public class dragCheckBox
// begin CheckBoxDemo class -- main functionality embedded in this top-level class
public class CheckBoxDemo extends JPanel
{
    dragCheckBox oneBox;
    dragCheckBox twoBox;
    dragCheckBox threeBox;
    dragCheckBox fourBox;
    // constructor
```

-continued

```
public CheckBoxDemo( )
{
    // Create and name the checkboxes
    oneBox = new dragCheckBox("one");
    twoBox = new dragCheckBox("two");
    threeBox = new dragCheckBox("three");
    fourBox = new dragCheckBox("four");
    // Set the intial states of the checkboxes
    // Reminder: setSelected( ) is defined in JCheckBox,
    // a standard class from which dragCheckBox inherits
    oneBox.setSelected(false);
    twoBox.setSelected(true);
    threeBox.setSelected(true);
    fourBox.setSelected(true);
    /** Register a listener/adapter object for each of the checkboxes.
    These listener/adapters wait for mouse events such as mouse presses,
    drags, and enters. Adapters are used to reduce specification of
    methods normally required of mouse listeners. **/
    CheckBoxListener myListener = new CheckBoxListener( );
    oneBox.addMouseInputAdapter(myListener);
    twoBox.addMouseInputAdapter(myListener);
    threeBox.addMouseInputAdapter(myListener);
    fourBox.addMouseInputAdapter(myListener);
    // Put the checkboxes in a column within the main panel so they
    // can be viewed in a user interface
    JPanel checkPanel = new JPanel( );
    checkPanel.setLayout(new GridLayout(0, 1));
    checkPanel.add(oneBox);
    checkPanel.add(twoBox);
    checkPanel.add(threeBox);
    checkPanel.add(fourBox);
    //Set layout and borders for the panel
    setLayout(new BorderLayout( ));
    add(checkPanel, BorderLayout.WEST);
    setBorder(BorderFactory.createEmptyBorder(20,20,20,20));
}//end public CheckBoxDemo( )
/** Create a CheckBoxListener class as a sub-class of the
CheckBoxDemo class. The CheckBoxListener class listens
for certain mouse events that occur on the checkboxes. This
class extends and modifies the MouseInputAdapter class to
implement the selection and toggle functionality **/
class CheckBoxListener extends MouseInputAdapter
{
    // Create a method that toggles the selected state of a checkbox
    // (not just a first checkbox) and holds the value of that checkbox
    // after it is toggled.
    public void toggleBox( )
    {
        // e is the object representing a mousepress in a first checkbox
        boolean sourceState = e.getSelected( );
        if(source.getSelected(true))
        {
            source.setSelected(false);
            sourceState = e.getSelected( );
            break;
        }//end if(source.getSelected(true))
        else if(source.getSelected(false))
        {
            this.source.setSelected(true);
            this.sourceState = e.getSelected( );
        }//end else if(source.getSelected(false))
    }//end public void toggleBox( )
    public void toggleDragBox( )
    {
        if(source.dragCheck(true))
        {
            if(source.getSelected(true)
            {
                this.source.setSelected(false);
                break;
            }//end if(source.getSelected(true))
            else if(source.getSelected(false))
            {
                this.source.setSelected(true);
            }//end else if(source.getSelected(false))
        } //end source.dragCheck(true))
    }//end public void toggleDragBox( )
    // Create a method that checks the source of an initial
    // mouse press and passes that source to a method
```

```
// that toggles a first checkbox.
public void toggleCheck( )
{
    if      (source == oneBox) oneBox.toggleBox( );
    else if (source == twoBox) twoBox.toggleBox( );
    else if (source == threeBox) threeBox.toggleBox( );
    else if (source == fourBox) fourBox.toggleBox( );
}//end public void toggleCheck( )
/** Create a method that checks the source checkbox of a mouse
drag or mouse enter, determines whether that source checkbox has
previously received a mouse drag or mouse enter operation. If the
source checkbox has not previously received a mouse drag or mouse
enter operation, compares the state of that source checkbox against
the selected state of a first checkbox, and changes the value of the
source checkbox to that of the first checkbox. If the source checkbox
has previously received a mouse drag or mouse enter operation,
toggle the source checkbox. **/
public void toggleNext( )
{
    if (source.getSelected( ) != sourceState)
        source.setSelected(sourceState);
    else if (source.getSelected( ) == sourceState) break;
}//end public void toggleNext
// Listen for an initial mouse press event on a checkbox.
// Method only listens for checkbox mouse press
public void MousePressed(MouseEvent e)
{
    /** Create a source object for the mouse event.
    Capture the source and test to find which checkbox
    originated the event.**/
    Object source = e.getSource( );
    CheckBoxListener.toggleCheck( );
}//end public void MousePressed(MouseEvent e)
// Listen for MouseDrag event. Create a source for that event.
public void MouseDragged(MouseEvent f)
{
    Object source = f.getSource( );
}//end public void MouseDragged(MouseEvent f)
// Listen for a MouseEnter event. Create a source for that event.
public void MouseEnter(MouseEvent g)
{
    Object source = g.getSource( );
}//end public void MouseEnter(MouseEvent g)
/** Create a method that compares MouseDrag and MouseEnter
events to
settle on a source for events. These are then passed to the toggleCheck
method, and
then to the toggleBox method.**/
public void DragEnter( )
{
    if((MouseDragged(MouseEvent f)) &&
    (MouseEnter(MouseEvent g))
    {
        Object dragsource = f.getComponent( );
        Object entersource = g.getComponent( );
        if(dragsource == entersource)
        {
            source == dragsource;
            if(this.dragCheck=false)
            {
                // set dragCheck
                this.dragCheck( );
                // set state of this
                // checkbox to sourceState
                checkBoxListener.toggleNext( );
            }
            else
            {
                this.toggleDragBox( );
            }
        } //end if(dragsource == entersource)
    }//end if((MouseDragged(MouseEvent f)) &&
    (MouseEnter(MouseEvent g))
}//end public void DragEnter( )
}//end class CheckBoxListener extends MouseInputAdapter
// The main method for the class. Creates a frame and
// makes its contents visible
public static void main(String s[ ])
{
```

```
    JFrame frame = new JFrame("CheckBoxDemo");
    frame.addWindowListener(new WindowAdapter( )
        {public void windowClosing(WindowEvent e)
        {System.exit(0);}});
    frame.setContentPane(new CheckBoxDemo( ));
    frame.pack( );
    frame.setVisible(true);
    }//end public static void main(String s[ ])
} // end CheckBoxDemo class
```

In fact, the pseudocode comprises a fairly complete illustration of an example embodiment, including as it does, for example, import statements for Java classes that implement GUI elements and classes for listening for GUI events. The pseudocode example also provides for extensions of standard interface capabilities by adding capabilities for checkboxes to listen for mouse events, selecting and deselecting checkboxes, and communicating checkbox status to other application elements. Using Java AWT and Swing classes, for example, checkbox statements for extension capabilities create objects in background. Actual instantiations are accomplished in the example pseudocode, as in typical Java application, by implementation methods such as those in the public class CheckBoxDemo statements.

The pseudocode includes setting initial values for checkboxes, which are any combination of selected and deselected items within a set of checkboxes. In the example, this function is accomplished via the public CheckBoxDemo statements, along with a oneBox.setSelected(false) statement, a twoBox.setSelected(true) statement, and so on.

The extended capabilities illustrated in the pseudocode include mouse event listeners adapted to detect in checkboxes mouse down events or 'mousepresses' as well as dragged mouse entries into checkboxes. For example, the method named MousePressed( ) detects a mouse press event, represented generally in the pseudocode by an object named 'e.' MousePressed( ) calls togglecheck( ), and togglecheck( ) checks each checkbox in turn to determine from which one the mouse press originated. togglecheck( ) then call the toggleBox( ) function in the checkbox object of the checkbox from which the mouse press originated. toggleBox( ) checks the current state of the checkbox (selected or unselected) and unselects the checkbox if it is currently selected, otherwise selects it. toggleBox( ) also sets sourceState. In our example pseudocode, the sourceState variable stores the new status of the first box clicked in a click-and-drag operation of a mouse or other GUI pointer.

Continuation of a click-and-drag operation by dragging a mouse pointer, with its mouse button held down, onto checkboxes is detected by calls from DragEnter( )to MouseDragged( ) and MouseEnter( ). DragEnter( ) identifies the checkbox onto which the pointer has been dragged. If the checkbox has not yet experienced a drag event during the current click-and-drag, then DragEnter( ) sets the dragcheck variable for the checkbox and sets the checkbox's selection status to the new status of the first checkbox by calling toggleNext( ). If the checkbox has been dragged over previously during the current click-and-drag (which set its state to the new selection state of the first checkbox), then DragEnter( ) toggles the selection state of the current checkbox by calling toggleDragBox( ).

As mentioned earlier, checkboxes subject to drag events within a click-and-drag include the first checkbox, the one in which a mouse press initiated a particular click-and-drag. This is true because users are empowered in typical embodiments of the present invention effect a mouse press in a first checkbox, thereby initiating a click-and-drag, and drag the pointer out of the first checkbox, and then later, during the same click-and-drag, drag the pointer back over the first checkbox. Here again is illustrated a reason why embodiments of the present invention are referred to as implementing non-persistent stateful toggles. That is, the toggles are 'stateful' in that their status changes depend on the status of the first checkbox and upon the current state of a dragged checkbox. And the toggles typically are 'non-persistent' in the sense that states resulting from stateful toggles nevertheless are altered by subsequent drag effects during a single click-and-drag.

In particular, the example pseudocode illustrates an implementation of these capabilities: Embodiments according to the pseudocode example create and name checkboxes and place them in a set. Such embodiments also implement capabilities for each checkbox to listen to mouse events such as 'mouse key is pressed down,' 'mouse pointer is dragged,' and 'dragged mouse pointer has entered a checkbox on screen,' and identify a checkbox as a source for such mouse events. Such embodiments also have the capability of checkbox status toggling such that, after an initial mouse press for a pointer over a checkbox, subsequent dragging over checkboxes changes the selection status of those checkboxes in accordance with the present invention.

In such embodiments, on an initial mouse press of a click-and-drag event, the source checkbox for the mouse press is toggled to a new selection state of the first checkbox affected by the click-and-drag. As the click-and-drag continues, on a first drag event over a checkbox, the checkbox dragged over has its selection state changed to the new state of the first checkbox. If a checkbox has already been dragged over but the mouse button has not been released, subsequent drag and entry over the same checkbox in a single click-and-drag motion has the effect of toggling the selection state of the checkbox. Releasing the mouse button ends a click-and-drag operation.

Embodiments of this invention have wide practical applications, including the following additional examples:

Additional alternative example embodiment: An e-commerce application in which a user selects multiple items for an online shopping cart. Prior to this invention, a user would need to provide a single click for each item in a shopping cart list, or select all items in a list. If the user desires to make ad hoc selections, which is likely in an online purchasing context, the user would need to make single clicks for each selection. Use of embodiments of this invention greatly simplifies the process, thus allowing a single click-and-drag operation to make multiple purchases.

Additional alternative example embodiment: An online search engine in which user selects returned search items by choosing those answers best meeting the original query.

Embodiments of this invention facilitate quick selection of those items, allowing the search engine to narrow the search criteria by profiling the selected documents.

Additional alternative example embodiment: A database application that allows ad hoc selection of multiple items, and subsequent search on the subset of selected items. Embodiments of this invention facilitate quick narrowing from a set of items returned from a database to a smaller subset. Such would be especially useful when selected items are linked in a sequence to a set of related data. For example, a real estate database may return a set of initial addresses. Users select items on an ad hoc basic and are then taken to data that characterizes those addresses.

Methods that facilitate ad hoc selection of checkbox items using a single click-and-drag operation achieve many goals of contemporary computing. Such methods are consistent with user interface design principles that encourage the minimum number of operations necessary to complete a task. From an ease-of-use perspective, a single click-and-drag approach to checkbox lists has several advantages. For example, it is vastly preferable for users with physical impairments that may make repeated selection of items difficult. These include users who have suffered repetitive motion injuries or whose fine motor skills make clicking on individual checkbox items more difficult. Guidelines from the Human Factors and Ergonomics Society (HFES 200-199X) encourage adoption of interfaces that address keyboard considerations, reduce multiple operations, and identify pointer alternatives, both for users who require assisting devices and those who do not. Even for those users who face no special challenges in pointer operation, this invention greatly reduces the difficulty in selecting multiple items in a checkbox list.

In conclusion, typical embodiments of this invention turn away from the traditional approach toward checkbox lists by providing, among other improvements, an option for users to change checkbox states for multiple checkboxes with a single click-and-drag operation, thus facilitating ad hoc selection of computerized data. Many embodiments of this invention are platform independent and suitable for compiled and web-based applications on any operating system.

It will be understood from the foregoing description that various modifications and changes may be made in the exemplary embodiments of the present invention without departing from its true spirit. The descriptions in this specification are for purposes of illustration only and should not be construed in a limiting sense. The scope of the present invention should be limited only by the language of the following claims.

What is claimed is:

1. A method for stateful toggling of checkbox status,
   the method implemented as a software program installed and operating on a computer comprising a computer processor coupled to computer memory,
   the computer comprising also a computer display which itself further comprises a graphical user interface ("GUI"),
   the method implemented on the GUI, the GUI operated by a user using a pointing device, the pointing device having a capability of indicating a touch on a checkbox, the pointing device having associated with it through the GUI a pointer displayed upon the GUI and responsive to physical motion of the pointing device,
   the GUI having displayed upon it a set of checkboxes comprising a multiplicity of checkboxes, wherein each checkbox has a selection status indicating whether a checkbox is selected and a drag status indicating whether the checkbox has experienced a drag event,
   the method comprising:
   detecting a touch event on a first checkbox;
   toggling the status of the first checkbox to a new status;
   detecting a first drag event for at least one additional checkbox onto which a user drags the pointer, including setting a drag status of the additional checkbox indicating that the additional checkbox has experienced a drag event;
   statefully toggling, to the new selection status of the first checkbox, the status of the additional touch box for which a first drag event is detected;
   detecting a subsequent drag event for the at least one additional checkbox onto which a user drags the pointer more than once during a click-and-drag operation, including determining in dependence upon the drag status of the additional checkbox whether the additional checkbox has experienced a drag event; and
   statefully toggling the selection status of the additional checkbox for which a subsequent drag event is detected to the opposite of the selection status of the additional checkbox when the additional drag event is detected.

2. The method of claim 1 wherein toggling the status of the first checkbox to a new status further comprises setting a drag status of the first checkbox.

3. The method of claim 1 further comprising repeating, for a multiplicity of repetitions, the steps of detecting a first drag event for at least one additional checkbox, statefully toggling the selection status of the additional touch box to the new selection status of the first checkbox; detecting a subsequent drag event for the additional checkbox, and statefully toggling the selection status of the additional checkbox to the opposite of the selection status of the additional checkbox when the additional drag event is detected.

4. The method of claim 3 wherein, for at least a portion of the repetitions, one or more further checkboxes are positioned upon the display screen in the GUI between two of the additional checkboxes, wherein a path along which the pointer drags between the two additional checkboxes lies outside the further checkboxes, whereby the statuses of the further checkboxes remain unaffected.

5. The method of claim 1 wherein detecting a touch event comprises changing a pointer device status to 'active' while a pointer for the device is positioned on the checkbox.

6. The method of claim 1 wherein the pointing device is a mouse.

7. The method of claim 1 wherein the pointing device is a stylus pressed upon a touch sensitive pad.

8. The method of claim 1 wherein the pointing device is a finger pressed upon a touch sensitive screen.

9. The method of claim 1 wherein the first checkbox has a GUI image and toggling the selection status of the first checkbox includes changing the GUI image of the first checkbox to indicate a change in the status of the first checkbox.

10. A system for stateful toggling of checkbox status,
    the system implemented with a software program installed and operating on a computer comprising a computer processor coupled to computer memory,
    the computer comprising also a computer display which itself further comprises a graphical user interface ("GUI"),
    the system implemented to include the GUI, the GUI operated by a user using a pointing device, the pointing device having a capability of indicating a touch on a checkbox, the pointing device having associated with it through the GUI a pointer displayed upon the GUI and responsive to physical motion of the pointing device, the GUI having displayed upon it a set of checkboxes comprising a multiplicity of checkboxes, wherein each checkbox has a selection status indicating whether a checkbox is selected and a drag status indicating whether the checkbox has experienced a drag event, the system comprising:

means for detecting a touch event on a first checkbox;

means for toggling the status of the first checkbox to a new status;

means for detecting a first drag event for at least one additional checkbox onto which a user drags the pointer, including means for setting a drag status of the additional checkbox indicating that the additional checkbox has experienced a drag event;

means for statefully toggling, to the new selection status of the first checkbox, the status of the additional touch box for which a first drag event is detected;

means for detecting a subsequent drag event for the at least one additional checkbox onto which a user drags the pointer more than once during a click-and-drag operation, including means for determining in dependence upon the drag status of the additional checkbox whether the additional checkbox has experienced a drag event; and means for statefully toggling the selection status of the additional checkbox for which a subsequent drag event is detected to the opposite of the selection status of the additional checkbox when the additional drag event is detected.

11. The system of claim 10 method of claim 1 wherein means for toggling the status of the first checkbox to a new status further comprises means for setting a drag status of the first checkbox.

12. The system of claim 10 further comprising means for repeated utilization, for a multiplicity of repetitions, of the means for detecting a first drag event for at least one additional checkbox, means for statefully toggling the selection status of the additional touch box to the new selection status of the first checkbox; means for detecting a subsequent drag event for the additional checkbox, and means for statefully toggling the selection status of the additional checkbox to the opposite of the selection status of the additional checkbox when the additional drag event is detected.

13. The system of claim 12 wherein, for at least a portion of the repetitions, one or more further checkboxes are positioned upon the display screen in the GUI between two of the additional checkboxes, wherein a path along which the pointer drags between the two additional checkboxes lies outside the further checkboxes, whereby the statuses of the further checkboxes remain unaffected.

14. The system of claim 10 wherein means for detecting a touch event comprises means for changing a pointer device status to 'active' while a pointer for the device is positioned on the checkbox.

15. The system of claim 10 wherein the pointing device is a mouse.

16. The system of claim 10 wherein the pointing device is a stylus pressed upon a touch sensitive pad.

17. The system of claim 10 wherein the pointing device is a finger pressed upon a touch sensitive screen.

18. The system of claim 10 wherein the first checkbox has a GUI image and toggling the selection status of the first checkbox includes changing the GUI image of the first checkbox to indicate a change in the status of the first checkbox.

19. A computer program product for stateful toggling of checkbox status, the computer program product implemented with a software program installed and operating on a computer comprising a computer processor coupled to computer memory, the computer program product implemented with a computer display which itself further comprises a graphical user interface ("GUI"), the computer program product implemented to operate with the GUI, the GUI operated by a user using a pointing device, the pointing device having a capability of indicating a touch on a checkbox, the pointing device having associated with it through the GUI a pointer displayed upon the GUI and responsive to physical motion of the pointing device, the GUI having displayed upon it a set of checkboxes comprising a multiplicity of checkboxes, wherein each checkbox has a selection status indicating whether a checkbox is selected and a drag status indicating whether the checkbox has experienced a drag event, the computer program product comprising:

a recording medium;

means, recorded on the recording medium, for detecting a touch event on a first checkbox;

means, recorded on the recording medium, for toggling the status of the first checkbox to a new status;

means, recorded on the recording medium, for detecting a first drag event for at least one additional checkbox onto which a user drags the pointer, including means, recorded on the recording medium, for setting a drag status of the additional checkbox indicating that the additional checkbox has experienced a drag event;

means, recorded on the recording medium, for statefully toggling, to the new selection status of the first checkbox, the status of the additional touch box for which a first drag event is detected;

means, recorded on the recording medium, for detecting a subsequent drag event for the at least one additional checkbox onto which a user drags the pointer more than once during a click-and-drag operation, including means, recorded on the recording medium, for determining in dependence upon the drag status of the additional checkbox whether the additional checkbox has experienced a drag event; and means, recorded on the recording medium, for statefully toggling the selection status of the additional checkbox for which a subsequent drag event is detected to the opposite of the selection status of the additional checkbox when the additional drag event is detected.

20. The computer program product of claim 19 wherein means for toggling the status of the first checkbox to a new status further comprises means, recorded on the recording medium, for setting a drag status of the first checkbox.

21. The computer program product of claim 19 further comprising means, recorded on the recording medium, for repeated utilization, for a multiplicity of repetitions, of the means for detecting a first drag event for at least one additional checkbox, means for statefully toggling the selection status of the additional touch box to the new selection status of the first checkbox; means for detecting a subsequent drag event for the additional checkbox, and means for statefully toggling the selection status of the additional checkbox to the opposite of the selection status of the additional checkbox when the additional drag event is detected.

22. The computer program product of claim 21 wherein, for at least a portion of the repetitions, one or more further checkboxes are positioned upon the display screen in the GUI between two of the additional checkboxes, wherein a path along which the pointer drags between the two additional checkboxes lies outside the further checkboxes, whereby the statuses of the further checkboxes remain unaffected.

23. The computer program product of claim 19 wherein means for detecting a touch event comprises means for changing a pointer device status to 'active' while a pointer for the device is positioned on the checkbox.

24. The computer program product of claim 19 wherein the pointing device is a mouse.

25. The computer program product of claim 19 wherein the pointing device is a stylus pressed upon a touch sensitive pad.

26. The computer program product of claim 19 wherein the pointing device is a finger pressed upon a touch sensitive screen.

27. The computer program product of claim 19 wherein the first checkbox has a GUI image and toggling the selection status of the first checkbox includes changing the GUI image of the first checkbox to indicate a change in the status of the first checkbox.

* * * * *